US005151187A

United States Patent [19]

Behmann

[11] Patent Number: 5,151,187

[45] Date of Patent: Sep. 29, 1992

[54] MEMBRANE BIOREACTOR SYSTEM WITH IN-LINE GAS MICRONIZER

[75] Inventor: Henry Behmann, Puslinch, Canada

[73] Assignee: Zenon Environmental, Inc., Burlington, Canada

[21] Appl. No.: 794,867

[22] Filed: Nov. 19, 1991

[51] Int. Cl.[5] ............ C02F 1/44; C02F 3/12

[52] U.S. Cl. ............ 210/607; 210/625; 210/629; 210/151; 210/195.2; 210/195.3; 210/205; 210/258

[58] Field of Search ............ 210/607, 623, 626, 629, 210/631, 651, 652, 151, 195.2, 195.3, 202, 205, 258, 259, 295, 625, 257.2

[56] References Cited

U.S. PATENT DOCUMENTS 3,269,542 8/1966 Renzi et al. ............ 210/151
3,773,659 11/1973 Carlson et al. ............ 210/151
4,861,471 8/1989 Nakao et al. ............ 210/195.3

FOREIGN PATENT DOCUMENTS 2430451 12/1980 France .
63-62599 3/1988 Japan .
312288 1/1991 Japan .

*Primary Examiner*—Stanley S. Silverman
*Assistant Examiner*—Christopher Upton
*Attorney, Agent, or Firm*—Alfred D. Lobo

[57] ABSTRACT

In a system for biodegrading oxidizable organic waste in a bioreactor in combination with a membrane ultrafiltration unit used to separate a high quality permeate from activated sludge which is returned to the bioreactor from the membrane unit as a recycle stream, it has been found that an in-line fine bubble diffuser or "micronizer" takes advantage of the kinetic energy in the recycle stream to aerate the biomass with surprising efficiency. The micronizer is positioned external to the biomass in the bioreactor; the discharge from the micronizer provides a microaerated tail-jet of the recycle stream which has been infused with a mass of air bubbles from 1-1000 μm in diameter. The velocity of the compressed air flowed into the micronizer keeps its pores from clogging with sludge. The energy of the recycle stream without the air is insufficient to provide the requisite motive force for adequate oxygen transfer and to establish a predetermined recirculation pattern.

19 Claims, 5 Drawing Sheets

MEMBRANE BIOREACTOR SYSTEM WITH IN-LINE GAS MICRONIZER

BACKGROUND OF THE INVENTION

Operation of aerobic bioreactors is highly sensitive to the energy required to treat biodegradable waste, and the time within which treatment is to be completed. Stated differently, given enough time and no reasonable constraint on the expenditure of energy, the challenge to operate a waste treatment system would be de minimis. Since the challenge is to provide a system which economically satisfies the time-energy sensitivity of its operation, the emphasis in the art is to provide the most efficient means for transferring as much oxygen into the bioreactor's reaction mass (aqueous suspension of biomass, namely, of organic solids and microorganisms) as is possible, within the least amount of time, using the least amount of energy, to produce treated water of acceptable quality.

More specifically, this invention relates to a unique combination of an aerobic bioreactor in which biodegradable waste generated by humans and/or other animals, and/or industrial process wastes are aerated with an activated sludge (waste-degrading microorganisms), and a membrane filtration unit which separates acceptably pure water from a recycle stream from the bioreactor, more effectively and economically than any known system. It is known that a membrane filtration device, whether a microfiltration or an ultrafiltration membrane, not only avoids the time penalty of gravity settling technology but also provides a highly effective purification means. What was not appreciated is that the permeate is typically less than 5% by volume of the feedstream flowed over the membranes so that the kinetic energy remaining in the concentrate is substantial. It is this remaining kinetic energy which I have capitalized upon.

The rate of transfer of oxygen limits the biomass concentration in an activated sludge wastewater treatment system (see *Aerobic biological Treatment of Wastewaters: Principles and Practice* by A. W. Bush Pg. 285-312 Oligodynamics Press 1971). There are numerous references teaching how to aerate a bioreactor (hereafter "reactor"); and, membrane devices have long been known to be highly efficient separating means to filter solids-free permeate ("permeate" for brevity) from the solids-containing concentrate ("concentrate"). But aerating a reactor efficiently is not simply a matter of blowing copious amounts of air through the suspension of solids in the reactor. The oxygen must be transferred to the suspension of solids. How effectively this is done is a measure of the economic success of the reactor.

Mindful of the foregoing considerations, the fact is that the cost of aerating a reactor effectively and efficiently requires a large expenditure of energy; and filtration through a membrane device requires a relatively high inlet pressure and high velocity of flow of concentrate through the membrane device; this requirement of high mass flow under elevated pressure in turn dictates high pump pressures, and high flow rates at elevated pressures which results in large pressure drops. All of which add up to such expensive operation that one skilled in the art would not expect that such a system might be economical with any combination of aerated bioreactor and membrane filtration unit.

In particular, the high energy requirements for pumping a suspension of organic solids from a bioreactor through a membrane filtration unit, and using the energy of the concentrate stream from the unit to entrain oxygen from an eductor requires that the kinetic energy of the concentrate stream be used to draw in and disperse the required oxygen-containing gas stream. Such a configuration has been suggested in French application 2,430,451 to Lambert et al filed Jul. 4, 1978. The efficiency of the system is adversely affected because dissipation of the kinetic energy of the recirculating stream provides no positive energy contribution to the recirculating stream.

The high mass flow and kinetic energy of the recirculating stream in the '451 reference contributes so much energy to the system that efficient mixing in the reactor results simply because of the high contribution of fluid energy, minimal residence time, and without concern as to the establishment of a recirculating pattern. Further, since a characteristic of an eductor is that its flow is limited by the mass flow of the recirculating stream and the resulting pressure drop generated in the eductor, under optimum conditions, one can typically only entrain less than about 1 volume of oxygen per 5 volumes of recirculating liquid, or, 1 volume of air per volume of recirculating liquid.

This physical limitation will be more readily understood by reference to the illustrative examples herebelow, in which a 30 liter reactor is provided with a recirculation stream of 6500 liter/hr (6.5 $m^3$/hr) so that the residence time is 16 sec. Of this stream, 3500 liter/hr goes to a single eductor which entrains 500 liter/hr of air. The inlet pressure of the recirculating stream into the eductor is 200 kPa gauge (30 psig). Though the membrane bioreactor system operates at low to medium pressure, in the range from about 100 kPa to 500 kPa, depending upon whether the membrane filtration device uses a microfiltration or ultrafiltraton membrane, a high mass flow of solids-containing concentrate is available for a recycle stream. This mass flow is high enough (i) to provide enough liquid as is required per unit of air entrained, (ii) to provide sufficient mixing to ensure homogenization of the biomass, and (iii) to establish a preselected recirculation pattern in the bioreactor.

I have found that the high cost of operation of the combination of a bioreactor and a membrane filtration device can be off-set with a particular form of in-line aerator positioned so as to provide a directed recirculating jet (referred to as a "tail-jet") within the reactor.

In particular, operation of a membrane filtration device requires accepting the possibility of serious membrane flux decline, that is the rate per unit area of membrane surface through which permeate leaves. Such decline is typically due to insufficient oxygen being introduced to meet the respiration rate of the biomass, resulting in clogging of the membrane's pores. This problem of clogging suggested that the use of a microporous gas diffuser means (such as a porous metal annular element) was contraindicated because of the proclivity of a microporous element to be clogged by biomass.

The challenge to provide the proper amount of air to an aerobic reactor has been addressed in numerous references such as *Wastewater Engineering* pp 492-502, Metcalf & Eddy Inc. McGraw Hill 1979; *Activated Sludge Process: Theory and Practice* by J. Ganczarczyk, pp 133-153, Marcel Dekker 1983; *Wastewater Treatment Plant Design* pp 241-258, Water Pollution Control Federation, 1977; and a host of patent references.

Favored among devices for introducing air into an aerobic reactor are jet aerators, because of the high oxygen transfer they efficiently provide, but have restricted flexibility because of their design. Jet aerators are also referred to as ejectors, injectors, venturi nozzles, and eductors. Such devices introduce oxygen and water in a two-phase stream at a velocity high enough to provide requisite mixing within the reactor. The two-phase stream leaves the jet aerator in the form of a free jet (referred to herein as a "tail-jet"), which having penetrated a certain distance into the surrounding liquid, loses its energy and breaks up into clouds of bubbles. (See *Sorption Characteristics of Slot Injectors and Their Dependency on the Coalescence Behaviour of the System*, by M. Zlokarnik Chemical Engineering Science Vol 34, pp 1265–1271, 1979; and, *Design Manual—Fine Pore Aeration Systems* U.S. Environmental Protection Agency, Office of Research and Development, Center of Environmental Research Information, Risk Reduction Engineering Laboratory, Cincinnati, Ohio 45268, Sep. 1989).

Though much of the requisite oxygen transfer takes place in the jet aerator before the tail-jet is ejected into the reaction mass, the oxygen in the two-phase stream must also be transferred to the biomass in the reactor, and this requires a substantial residence time. Since the stream must also provide the motive force for adequate recirculation of the biomass, it is economical to provide such energy with only as high a recirculation rate of liquid as will provide the necessary oxygen requirement, since pumping costs provide efficient movement of liquid.

Prior art devices relied upon the recirculation stream to provide the kinetic energy for entrainment of oxygen and mixing of the reaction mass. There is little motivation to provide recirculation energy in a recycle loop by using the energy of air (oxygen and/or ozone) under pressure which air is required to feed oxygen to the biomass.

Yet I have done provided such energy derived from the air used. I have been able to do so because of the use of an in-line porous element having through-pores which place its interior and exterior surfaces in open fluid communication, referred to as a "gas micronizer" (or "micronizer" for brevity), so located as to provide a tail-jet to establish a recirculation pattern within the reactor. The micronizer is preferably located outside the reactor, and operated in the recycle loop in combination with the reactor and membrane device of my membrane bioreactor system, as will be described in greater detail hereinafter.

SUMMARY OF THE INVENTION

It has been discovered that an aerobic bioreactor in combination with a membrane filtration device and an in-line micronizer in the recycle loop which allows recirculation of concentrate from the membrane device to the bioreactor, results in operation of the system with unexpectedly good time-energy sensitivity, despite the relatively high costs of operation of a compressor which uses oxygen, in an oxygen-containing gas stream, to provide a substantial portion of the motive force required to establish a desired recirculation pattern of the solids suspension in the reactor. The recirculation pattern is established with a tail-jet which directs the recirculating stream into a preselected zone within the reactor. The remainder of such motive force is provided by a pump means which continuously recirculates a portion of the reaction mass in the bioreactor.

It is therefore a general object of this invention to provide a process for aerating biochemically oxidizable material in the presence of activated sludge particles using a membrane-bioreactor system in which a micronizer means is positioned external to the bioreaction zone so as to provide a tail-jet to establish a recirculation pattern within the reactor. The micronizer is pressurized with a gas containing at least 20% oxygen, and requires a relatively high-velocity stream of coaxial, internally flowing, recirculated concentrate from the membrane filtration device, to shear incoming gas so as to entrain bubbles of the gas having a diameter under pressure in the range from about 1 to about 1000 μm (microns), in a stream of microaerated concentrate. The microaerated concentrate, now containing the energy of the flowing liquid together with that of the compressed gas, is ejected beneath the surface of the reaction mass to provide requisite oxygen transfer and recirculation velocity to the reaction mass. The energy of the recycle stream without the air or other oxygen-containing gas, is insufficient to provide the requisite motive force for adequate oxygen transfer, and to establish a predetermined recirculation pattern.

It is a specific object of this invention to provide a wastewater treatment process utilizing a membrane-bioreactor system, the process comprising, (a) continuously pumping an aqueous suspension of waste organic material and activated sludge particles from a bioreaction zone, to a membranous filtration zone from which water which is essentially solids-free, is to be recovered;

(b) flowing said suspension through said membranous filtration zone at a velocity and pressure sufficient to maintain a predetermined membrane flux in said filtration zone, at which flux essentially no solids are retained on the surface of membrane in said filtration zone;

(c) separating water which is essentially solids-free, as a permeate from a solids-containing concentrate, and removing said permeate from said membranous filtration zone;

(d) directly flowing said solids-containing concentrate from said membranous filtration zone into a gas micronizing zone without introducing any additional energy into said concentrate until it is introduced into said micronizing zone;

(e) introducing said concentrate axially into said micronizing zone, while radially discharging into said zone a gas containing at least about 20% oxygen under pressure in the range from about 150 kPa to about 1000 kPa so as to incorporate micronized gas bubbles having an average diameter in the range from about 1 to about 1000 μm into said concentrate, forming a microaerated concentrate having separate gas and liquid phases;

(f) directly flowing a continuous stream of said microaerated concentrate from said micronizing zone into said bioreaction zone without introducing any additional energy into said microaerated concentrate after it leaves said micronizing zone; and, (g) introducing a tail-jet of said microaerated concentrate below the surface of liquid in the reactor to establish a recycle loop in said bioreaction zone, and at the same time, directing said tail-jet into said bioreaction zone so as to maintain an average liquid velocity of at least 0.3 meter/sec within the bioreaction zone while also maintaining a pattern of circulation therein.

It is also a specific object of this invention to provide the above process in which a feed of aqueous biodegradable waste is continuously introduced into the bioreactor; and to withdraw, either periodically or continuously, a bleed stream of concentrate from the recycle loop prior to introducing said concentrate into the micronizer, to modulate the solids concentration in the bioreaction zone.

It is a further specific object of this invention to provide the above process in which the concentrate is introduced axially into the micronizer at a velocity of at least about 3 meters/sec; the microaerated concentrate provides an oxygen transfer into the reaction mass of up to 500 mg/liter/hr; and, the recycle loop provides a power efficiency for the membrane-bioreactor system, of at least 0.9 kg $O_2$/kWh.

It is still another specific object of this invention to position an in-line micronizer externally relative to the bioreactor and to introduce the tail-jet under the surface of liquid in the reactor to complement the geometry thereof to establish a desirable recirculation pattern, preferably vertically and substantially centrally within a small to mid-size reactor in the range from about 5000 liters to 50,000 liters.

It has also been discovered that, despite the elegant simplicity of the membrane-bioreactor system which relies on only two moving parts, namely a compressor (or high pressure blower) and a pump, the system provides surprisingly (a) high oxygen transfer rates, able to support the maximum biomass concentration, and (b) high oxygen transfer efficiency over a wide range of flow of wastewater through the system, without sacrificing oxygen economy even when enriched oxygen is used. When a cylinder of gas provides the source of pressurized gas, the system relies on only one moving part, namely the pump.

It is therefore also a general object of this invention to provide a wastewater treatment system to be connected between a wastewater inlet and an outlet for treated effluent, comprising, (a) a bioreactor with means for receiving wastewater containing biodegradable solids, in which bioreactor said wastewater is contacted with waste-degrading microorganisms mixed therein;
(b) pump means for withdrawing a suspension of said solids from said bioreactor, and impelling said suspension at elevated pressure through a discharge line;
(c) membrane filtration means in fluid communication with said pump means, said membrane filtration means including plural membrane elements adapted to separate said suspended solids in a concentrate stream from water permeate which is essentially free of solids, and means to duct said permeate away from said system;
(d) a gas micronizing means, preferably externally disposed relative to said bioreactor and said filtration means, in fluid communication with said filtration means; said gas micronizing means comprising, a tubular microporous body coaxially housed in a housing adapted to contain said gas under elevated pressure; inlet means for said gas in said housing; and, inlet and outlet means for the concentrate stream to be flowed through the gas micronizing means; control means of inlet means proportional to the residual dissolved oxygen ("DO") concentration and,
(e) conduit means directly placing said gas micronizer means in fluid communication with said wastewater in said bioreactor, said conduit means having a tail-jet outlet adapted to discharge a tail-jet of mixed gas and liquid phases below the surface of said wastewater at a velocity sufficient to generate a chosen pattern of recirculation in said bioreactor while maintaining a liquid velocity of at least 0.3 meter/sec within said bioreactor.

It is a specific object of this invention to operate a membrane-bioreactor system in which the combination of a pump means and a source of pressurized oxygen-containing gas, such as a blower or compressor means, or other source of pressurized gas in a recycle loop, provides all the energy for microaerating the reaction mass with micron-sized bubbles less than 10 μm in diameter, preferably from 0.1 μm to about 1 μm in diameter, of oxygen-containing gas, at the same time, maintaining necessary recirculation within the bioreactor; obtaining an oxygen transfer rate in excess of 30 g/L/day at greater than 15% transfer efficiency using unenriched air; and, accomplishing the foregoing by manipulating a single valve means using feedback control means actuated by the dissolved oxygen ("DO") concentration of the bioreactor.

BRIEF DESCRIPTION OF THE DRAWING

The foregoing and additional objects and advantages of the invention will best be understood by reference to the following detailed description, accompanied with a schematic illustration of a preferred embodiment of the invention, in which.

DETAILED DESCRIPTION OF PREFERRED EMBODIMENTS

In a preferred embodiment the membrane-bioreactor system is intended for use by those concerned with the cost of treating wastewater generated in relatively small volume compared to the volume of biodegradable waste generated by a metropolitan area.

The efficiency of the preferred system is predicated upon control of all factors which influence the overall time-energy sensitivity (hence, power requirement) of the system. In particular, the rate of oxygen transfer (mg/L/hr) to the reaction mass, and therefore, the power efficiency (kg $O_2$/kWh) are controlled. More particularly, the efficiency of the claimed invention is predicated upon the use of a pressurized gas micronizer which is an energy-supplying inline diffuser rather than an energy-abstracting jet aeration device. The comparison of different devices which introduce air to aerate the biomass in different ways, demonstrates that there is a surprising difference in the effectiveness of the devices stemming from the different way in which air is introduced and utilized, in turn affecting the energy-efficiency of each processes in which each device is used.

Figure 1:
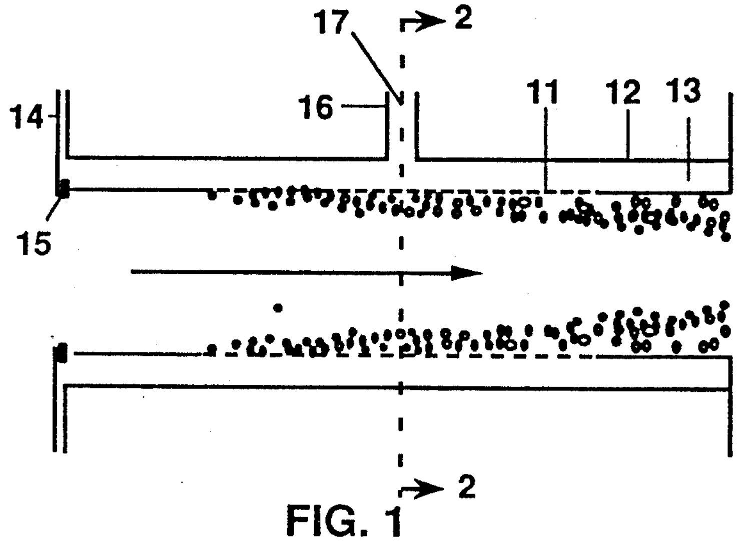
FIG. 1 is a side elevational cross-sectional view diagrammatically illustrating one embodiment of a gas micronizer.
Figure 2:
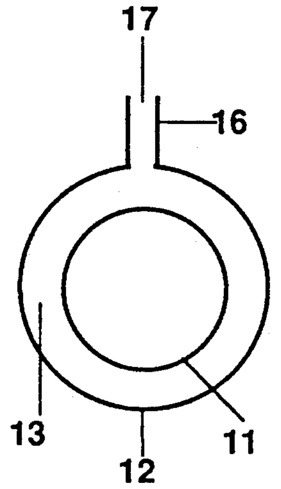
FIG. 2 is a cross-sectional view taken along the line 2—2 in FIG. 1.

In more detail, a gas micronizer means indicated generally by reference numeral 10 in FIG. 1 comprises at least one tubular microporous inner body referred to as an annular diffuser element 11, coaxially housed in an outer body or housing 12 in sealed relationship with the diffuser element, near the ends thereof, so that the annular space 13 between the outer surface of the diffuser element 11 and the inner surface of the housing 12, is adapted to contain gas under elevated pressure. Any sealing means may be used to effect the desired seal, a conventional way being to provide terminal matching tubular sections which are clamped to the ends of the housing 12 with clamping means 14 which have an internal O-ring 15 which provides a gas-tight seal for the annular space 13.

The housing 12 is provided with a gas inlet 16 to which oxygen-containing gas 17 under pressure in the range from about 150 kPa to about 1000 kPa is supplied. The annular diffuser 11 is typically a porous cylinder, preferably of metal, having through-pores in the range from 1 μm to about 100 μm (microns or micrometers), preferably less than 1O μm, through which gas under pressure emerges in a multiplicity of streams each comparable in diameter to the diameter of a pore in the metal cylinder. Solids-containing water (concentrate) under pressure is flowed through the bore 18 of the diffuser element 11 at a velocity sufficient to shear the thin gas stream into a very large number of micron-sized gas bubbles which become entrained in the water. Depending upon the relative pressures of the concentrate and gas streams, and the pressure drop through the diffuser 11, the size of the gas bubbles range from about 1 to about 1000 μm, but are preferably less than 10 μm as they leave the surface of the microporous element. Upon becoming entrained, the bubbles contribute their kinetic energy to that of the concentrate stream.

Figure 3:
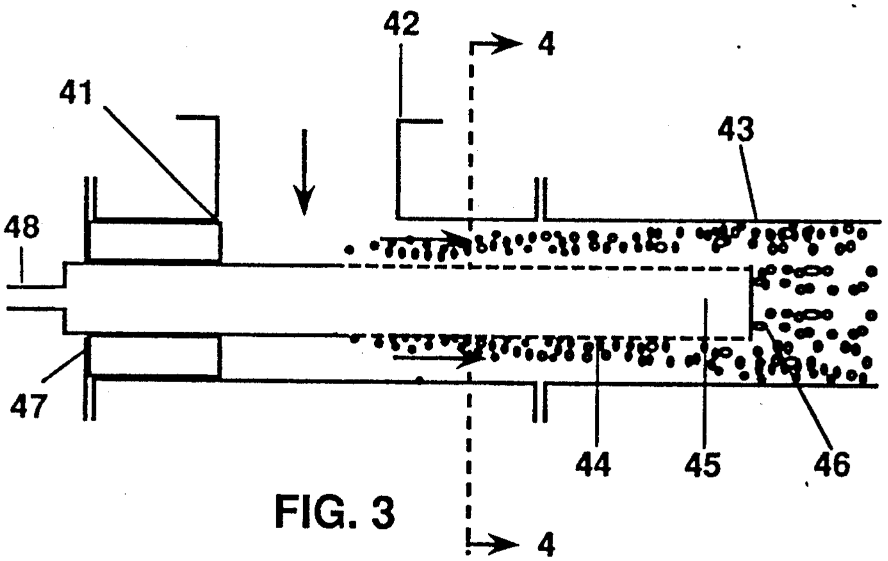
FIG. 3 is a side elevational cross-sectional view diagrammatically illustrating another embodiment of a gas micronizer.
Figure 4:
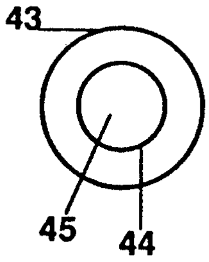
FIG. 4 is a cross-sectional view taken along the line 4—4 in FIG. 3.

In another embodiment illustrated in FIG. 3, a tee 41 is inserted between orthogonally oriented ends 42 and 43 of a recycle conduit (see FIG. 5) in a recycle loop. A porous cylindrical diffuser element 44 having an axial bore 45 and capped with a cap 46 is sealingly fitted into the tee 41, as for example with a bushing 47. The bushing positions the element 44 centrally coaxially within the aligned arms of the tee 41. A source of compressed air is flowed through a connecting fitting 48 into the bore 45 and is diffused radially through the pores of the element 44 into the recirculating liquid stream flowing over the element.

The surprising contribution of the gas micronizer to the time-energy sensitivity of the membrane-bioreactor system was discovered by making a comparison of the gas micronizer (commercially available as a Mott Gassaver ®), a jet aeration device (commercially available as a Pardee Eductor ®), and a coarse bubble diffuser (commercially available as a PCI Hydro-Chek ® Air Diffuser).

Figure 5:
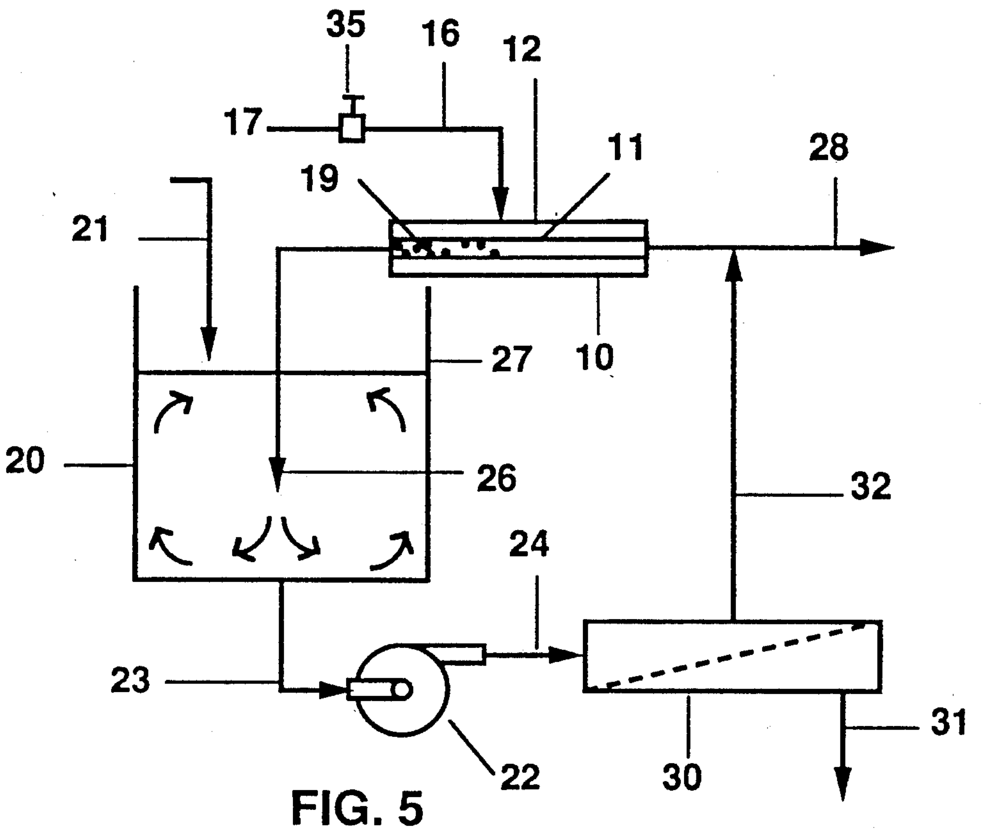
FIG. 5 is a flowsheet which schematically illustrates the configuration of a membrane-bioreactor system in which the reaction mass in a bioreactor is kept continuously recirculated by a two-phase fluid tail-jet; a membrane filtration device and a gas micronizer are exteriorly connected in fluid communication, in a recirculation (or "recycle") loop; and all the energy required to operate the system is provided by a recirculation pump and a gas compressor means which pressurizes the micronizer. As illustrated, the tail-jet is introduced axially vertically in the bioreactor and discharges the tail-jet downward against the bottom of the bioreactor, forming a looping pattern (in an elevational view) in each vertical half-section of the vessel.

Referring now to FIG. 5 there is shown a membrane-bioreactor system comprising a bioreactor indicated generally by reference numeral 20, which is preferably a large vessel, deeper than it is wide. Wastewater feed enters the bioreactor through feedpipe 21 and is mixed with an appropriate amount of a culture of microorganisms until the bioreactor has received a predetermined volume to be used as its reaction mass. The recycle stream is continuous. To protect the reactor against operation with too low a liquid level, a float-operated switch (not shown) is provided. The switch sends a signal to actuate a motor driven pump means 22 for withdrawing a predetermined amount of the reaction mass (referred to as the "recycle stream") per unit time through suction line 23, solids from which recycle stream are to be recycled to the bioreactor through a recycle loop.

The pump 22 discharges a pressurized recycle stream through line 24 to a membrane filtration unit indicated generally by reference numeral 30.

It is preferred to use a membrane filtration unit 30 in which the membrane has a pore size smaller than 1 μm, and more preferably smaller than 0.2 μm, typically in the range from about 0.00 μm–0.5 μm, with a clean water flux (measured at 20° C. and 370 kPa) of at least 10 $m^3/m^2$/day. The larger the pore size, generally the lesser the quality of the water permeate.

Preferred membranes for microfiltration are derived from poly(vinyl alcohol), polysulfone, polypropylene, nylon and the like, for example Zenon SJ. The same materials may be used to provide ultrafiltration membranes, for example a Zenon TAM membrane. The particular type and configuration of membrane filtration unit, whether spiral wound or tubular, is not narrowly critical. As an illustrative example, a 3.78 $m^3$ (1000 gal) bioreactor may be operatively connected with one or more multi-tube membrane units of commercially available Zenon Z8 modules with HSC or TAM membranes. Each such module contains eight (8) 1.83 m long tubes, each having a diameter of 2.22 cm, connected in series to provide a membrane area of 0.975 $m^2$/module. The modules themselves connected in parallel with the concentrate recycle to the bioreactor. A liquid level control system maintains the reactor volume within desired limits.

Permeate from the membrane unit 30 is removed from the system through permeate conduit 31, while concentrate leaves through concentrate conduit 32. The outlet pressure of the concentrate in line 32 is in the range from about 10 kPa to about 50 kPa lower than that in the inlet line 24 to a microfiltration unit; and, from about 50 kPa to 400 kPa lower than that in the inlet line to an ultrafiltration unit, depending upon the configuration of the membrane units.

The volume of permeate removed will depend upon the physical characteristics of the reaction mass as well as the specifications of the membrane. Typically the permeate will range from about 0.5% by volume or even less, to about 3% by volume of the incoming recycle stream flowing through inlet line 24. A portion of the permeate may be recycled (not shown) to the bioreactor, if desired, to maintain a balance between incoming feed to the membrane device and removed generally circular recirculation pattern, viewed in plan view, near the bottom.

Figure 8:
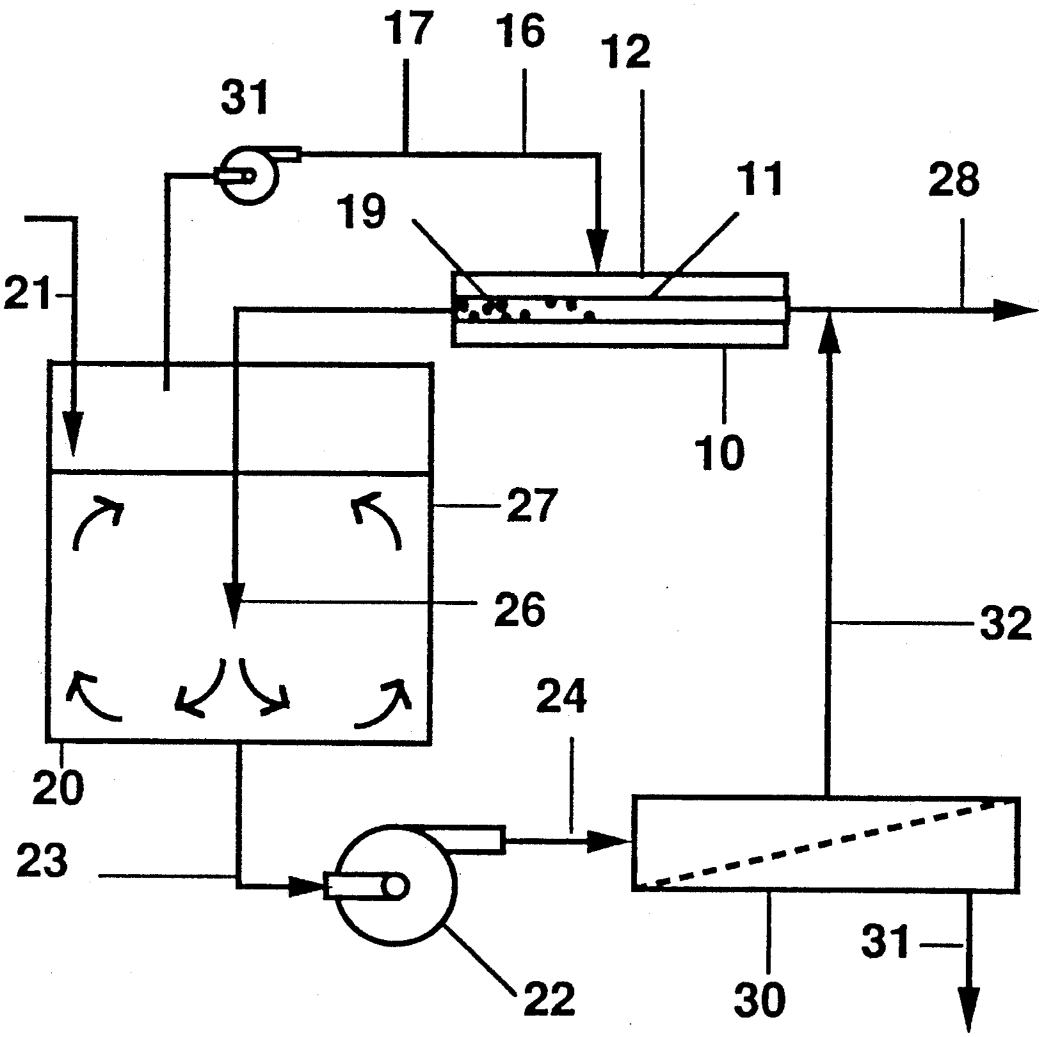
FIG. 8 is a schematic representation of a closed bioreactor the gas from which is recycled and enriched with $O_2$ before being pumped to the micronizer.
Figure 9:
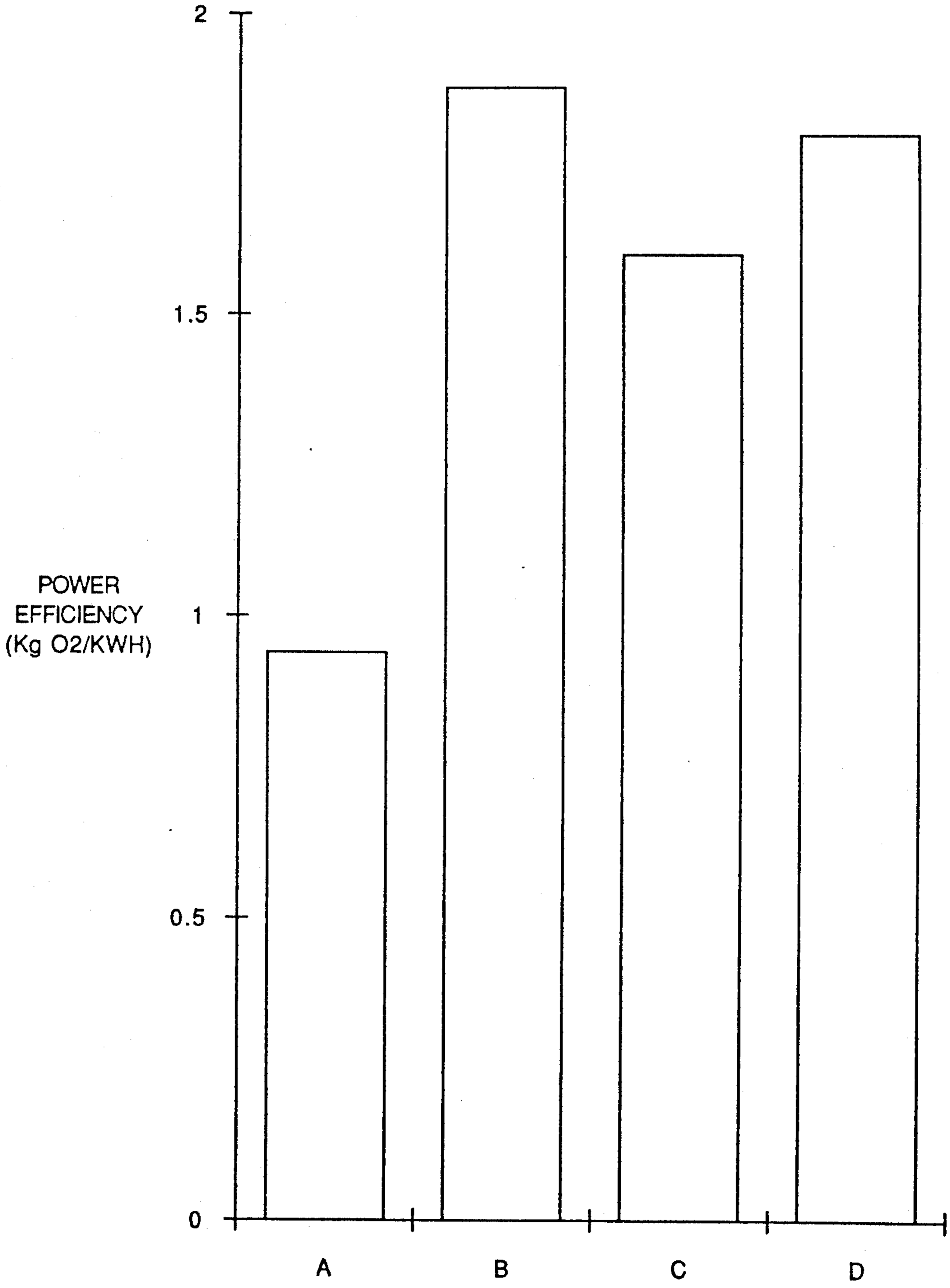
FIG. 9 is a bar graph comparing the power efficiency (kg $O_2$/kWh) for an eductor (Pardee), a micronizer (Mott Gassaver directing the tail-jet in each of the aforementioned two patterns), and a coarse bubble diffuser (HydroChek).

In another embodiment, illustrated schematically in FIG. 8, a bioreactor 20' is specifically operated to treat volatile organic components ("VOCs") present in the wastewater stream 21. Such VOcs typically include chlorocarbons such as perchloroethylene, other conventionally used dry cleaning fluids, the light components of gasoline such as butane and pentane, aromatic constituents such as toluene, xylene and benzene, and the like. A specific example of a sealed, recirculated gases, bioreactor system is one in which wastewater is introduced which contains one or more of the VOCs. The bioreactor is provided with a gas-take-off line 33 for exhaust gases, but is otherwise sealed against leakage of gas to the atmosphere. Exhaust gases are removed through line 33 by compressor 31 and introduced under sufficient pressure into micronizer 10 to provide the desired $O_2$ transfer to the biomass maintained at a desirable liquid level within the reactor. The compressed recirculated gases removed from the reactor are enriched by substantially pure $O_2$ through valve 35 before it is introduced into the micronizer 10.

The amount of $O_2$ introduced through line 17 corresponds to the amount used in bio-oxidation of the organic waste components, and for respiration of the biomass. Recirculation of the reactor gases allows for its biodegradation so that it is necessary to vent to stack only a small fraction of the gas generated in the reactor. Alternatively, if the vented gases include significant residual amounts of VOCs, the gases may be further treated by carbon adsorption or catalytic combustion.

It has been found that it is both difficult, and an unwarranted hardship to make reasonably accurate and reproducible determinations with live microorganisms in a pilot plant environment. To obtain results which were not subject to the permeate.

Concentrate in conduit 32 is flowed inside the gas diffuser element 11 of the gas micronizer 10 at a velocity of at least 1.5 m/sec, preferably in the range from 1.5–10 m/sec, so as to provide a shearing force along the inner surfaces of the diffuser element. Gas 17, metered through valve 35, enters the housing 12 of the micronizer 10 under pressure in line 16 and is diffused through micropores into the shearing liquid which generates mainly micron-sized bubbles 19 less than 10 $\mu$m in diameter, in the concentrate, forming a microaerated concentrate stream.

The kinetic energy of the gas stream is added to that of the shearing liquid to effect excellent mixing within the diffuser element. In large diffuser elements having a diameter in excess of about 10 cm, it may be desirable to provide mixing vanes to enhance mixing efficiency and ensure a substantially homogeneous mixture of separate gas and liquid phases in a fluid tail-jet.

The tail-jet is flowed through conduit 26 and enters below the surface 27 of the biomass in the reactor. As shown, the tail-jet enters axially vertically, and is directed vertically downwards so that the tail-jet is diverted by the bottom of the bioreactor, symmetrically to the sides of the vessel 20, thus maintaining a generally vertical but looping recirculation pattern ("loops") viewed in elevation, the loops being generally mirror-images in each vertical half of the vessel, as illustrated by the arrows.

Figure 6:
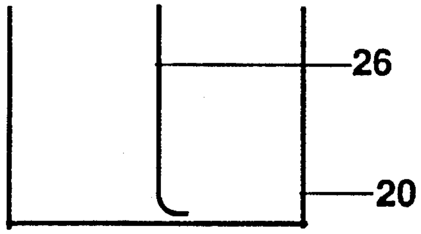
FIG. 6 is a schematic illustration of the bioreactor only, used in the system illustrated in FIG. 5, except that the tail-jet is introduced into the bioreactor along a wall, then discharged along the bottom of the reactor tangentially, so that the tail-jet is flowed around the circumference of the bottom of the bioreactor, generating a horizontal, circular pattern (in plan view).
Figure 7:
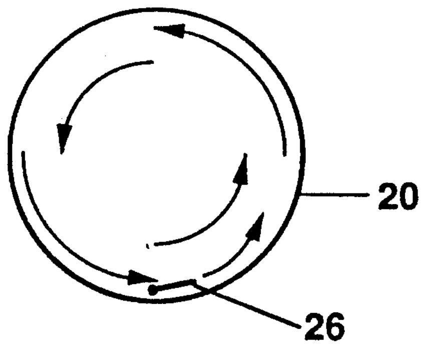
FIG. 7 is a plan view of the bioreactor shown in FIG. 6, schematically illustrating the circumferential flow pattern which is generated by discharging the tail-jet as shown in FIG. 6.

In a different operating mode, illustrated in FIGS. 6 and 7, the tail-jet is introduced along a reactor wall and flowed circumferentially near the bottom of the vessel. As the arrows illustrate, the recycle inlet 26' approaches the bottom of the vessel 20 and the tail-jet is discharged from the inlet so as to flow along the periphery of the bottom, near the inner surface of the vessel, thus generating a variables inherent with using live microorganisms, their presence was simulated in the following experimental runs conducted in a pilot plant using sodium sulfite catalyzed by cobalt sulfate to measure oxygen transfer rates, using tap water, and measuring the effects of aerating (oxidizing) the sodium sulfite with air.

The measured parameters were time, DO concentration, gas and liquid pressures and flows, and temperature. The information derived included oxygen transfer coefficient, oxygen transfer rate, overall energy efficiency, oxygen conversion efficiency, and power density, details of which will be provided hereinafter.

To measure the effect of utilizing each different aerator device, the aforementioned data were recorded and measurements made for each device in a recirculation system, so that four different configurations were tested.

The bioreactor used is a vessel about 90 cm diameter, and 130 cm high, having a capacity of about 300 liters. The pump is a single stage centrifugal pump having a capacity of 40 L/min at 413 kPa. The Pardee Eductor and the PCI HydroChek Air Diffuser each had a rated gas flow in the range from 10 to 40 Lpm, as did the Mott Gassaver. Pressure gauges were used for water and air. Flow rates read by flow meters were confirmed by measuring the flow into a bucket and timing the flow with a stopwatch. Dissolved oxygen ("DO") was measured with a dissolved oxygen meter. Compressed air was provided by an air cylinder and the flow controlled by a regulator.

After operably connecting the required system components, the vessel is filled to a chosen operating level and the pump and air turned on. The flows of liquid and air are adjusted and calibrated. The temperature of liquid and air is measured and the DO meter/recorder activated. The initial DO and temperature are noted. The air/$O_2$ valve is opened and the experiment is allowed to proceed until the DO reaches a specified level. Readings are taken at intervals as the DO concentration increases. The temperature is again measured and flows again determined.

For each aeration device the following runs were made:

2 runs at each of three water pressure/flow settings;
2 runs at each of three air pressure/flow settings;
2 runs at each of two air aerator jet positions in the tank.

In all runs, the temperature of the water in the system is 20°±3° C. and atmospheric pressure used to saturate the water with oxygen. The reactor pressure is also atmospheric (101 kPa abs). The rate of oxygen uptake, also referred to as the oxygen transfer rate, is defined as mg of oxygen transferred into 1 liter of water per unit time, which is the rate at which oxygen is transferred into the water.

In the following runs a determination of time was made to dissolve enough oxygen to provide an excess in the system, this excess being a concentration of 0.5 mg/L, because to attain this concentration after having satisfied the oxygen demand of residual sodium sulfite, it does not take an excessive amount of experimental time, yet the concentration can be accurately measured. For each run, tap water was first saturated with oxygen (8 mg $O_2$/L) by blowing air through it. The oxygen content is reduced to zero by adding enough sodium sulfite to provide a predetermined oxygen demand per liter (due to the residual sodium sulfite not used up by initial $O_2$). Because I start with a saturated oxygen system each time, the residual demand for oxygen is the same for each run.

In the following specific examples 300 L of tap water are used, and exactly enough sodium sulfite is added to provide an oxygen demand of 42 mg of $O_2$/L.

The duration of each run was for a period sufficient to satisfy the $O_2$ demand (42 mg/L) and provide the residual of 0.5 mg $O_2$/L.

In a typical run where the 0.5 mg $O_2$/L is satisfied in 1.93 min., the oxygen transfer rate per unit volume=42 mg/L / 1.93 min.=21.8 mg/L/min.

Converting this to the oxygen transfer rate (by multiplying the volume of the contents of the system), we find the oxygen transfer rate is 0.39 kg $O_2$/hr.

The power efficiency is computed from the theoretical power requirement to provide the necessary air, and the necessary recirculation to result in the oxygen transfer rate.

In a specific instance where I provide 0.14 $m^3$/min of air at 138 kPa, the power of the air input is 0.17 kWh. In a specific instance where I provide a pumping rate of 46.6 Lpm at a discharge pressure of 55.1 kPa, the power of the water input is 0.037 kW.

The rate of oxygen transfer per unit of power is 1.5 kg $O_2$/kWh.

In all instances the power efficiency is for runs in which the average linear velocity in the reactor is at least 0.3 m/sec with an established desirable recirculation pattern.

The following comparison is made for three aeration devices. The eductor in the recycle loop utilizes only the energy supplied by the pump to the recycle stream. The coarse bubble diffuser utilizes only the energy of the air supplied to it. The gas micronizer uses a combination of the energy supplied by both air and water.

In the following runs, the Mott Gassaver gas micronizer is external located relative to the reactor and the location of the tail-jet under the surface of the liquid in the reactor is identified. The flow through the micronizer provides a Reynolds number of at least 20,000. The length of the porous element is 6 ins (15.25 cm) in a pipe having a diameter of 2" (5.1 cm) exposing an area of about 36 $in^2$ or 0.25 $ft^2$ (232 $cm^2$ or 0.0232 $m^2$). The porous setion of the device is a 2 $\mu$m stainless steel frit. The working range of air/concentrate (vol/vol) is from about 3.7 to 9.4 while maintaining a preponderance of micron-sized bubbles.

The eductor (analogous to one used in the '451 Rhone Poulenc reference) is a Pardee unit positioned outside the reactor. The coarse bubble diffuser is positioned within and at the bottom of the reactor. The coarse bubble diffuser is a PCI Hydro-Chek unit (see U.S. Pat. No. 3,525,430) which uses a rubber diaphragm as a check valve against liquid back flow into through passages through which air is blown into the reactor. Neither the eductor nor the coarse bubble diffuser is effective at a air/concentrate ratio greater than 2.

Referring to FIG. 8 there is shown a bar graph in which Power Efficiency is quantified for each specific device used. In each case, a statistically significant number of runs is made, and the average plotted. Bar A represents the power efficiency of the Pardee eductor; bar B represents the power efficiency of the Mott Gassaver micronizer with the tail-jet ejecting the recirculating concentrate vertically directly downward, axially in the center of the tank; bar C represents the power efficiency of the Mott Gassaver micronizer with the tail-jet ejecting the recirculating concentrate in the bottom of the tank directed tangentially, so that it follows the periphery of the tank and forms a circular pattern; and bar D represents the power efficiency of the PCI HydroChek coarse bubble diffuser.

It is evident that the power efficiency of the gas micronizer is equal to or better than that of the other two devices, and in the illustrative examples is at least 10% better. In general, the power efficiency of the gas micronizer is in the range from about 10% to about 100% better than that of the eductor. This difference in power efficiency is of great economic significance in a commercial waste water treatment facility.

Figure 10:
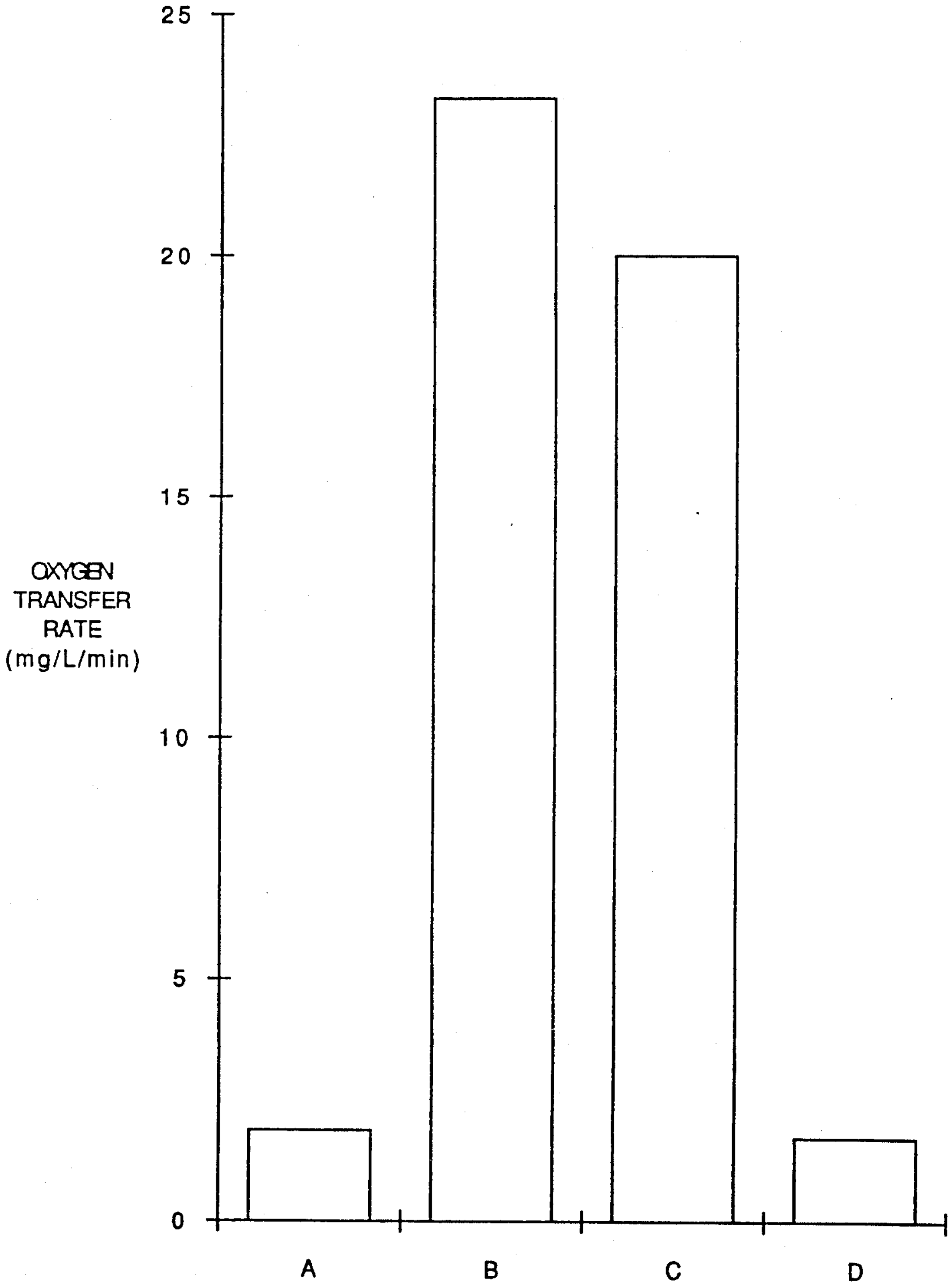
FIG. 10 is a bar graph comparing the rate of oxygen transfer (mg/liter/min) for an eductor (Pardee), a micronizer (Mott Gassaver directing the tail-jet in each of the aforementioned two patterns), and a coarse bubble diffuser (HydroChek).

Referring to FIG. 10 there is shown a bar graph in which the rate of oxygen transfer ("oxygen transfer rate") for each of the devices is quantified. Again a statistically significant number of runs is made, and the average plotted. Bar A represents the oxygen transfer rate of the Pardee eductor; bar B represents the oxygen transfer rate of the Mott Gas-saver micronizer with the tail-jet ejecting the recirculating concentrate vertically directly downward, axially in the center of the tank; bar C represents the oxygen transfer rate of the Mott Gassaver micronizer with the tail-jet ejecting the recirculating concentrate in the bottom of the tank directed tangentially, so that it follows the periphery of the tank and forms a circular pattern; and bar D represents the oxygen transfer rate of the PCI HydroChek coarse bubble diffuser.

It is evident that the oxygen transfer rate of the gas micronizer is substantially better than that of the other two devices. In the illustrative examples the oxygen transfer rate of the gas micronizer is more than five times that of either of the other two devices. In general, the oxygen transfer rate may be from about 3 to 15 times as great as that of an eductor or a coarse bubble diffuser.

The high rate of oxygen transfer obtained with a gas micronizer is of especial economic and technical significance in systems where both high capacity and compactness are at a premium.

When the experiments are repeated using oxygen-enriched air, analogous results are obtained.

EXAMPLE 1

An industrial effluent consisting of non-hazardous waste transfer station effluent from Guelph, Ontario was treated. This effluent is the aqueous phase left after emulsion-breaking a mixture of food, paint, laundry and industry wastes. Concentrations of BOD (biochemical oxygen demand) and TOC (total organic carbon) were very high averaging ≈5000 mg/L BOD and 2200 mg/L TOC. The equipment used to treat this waste is schematically shown in FIG. 5 with the specific variables indicated below.

The reactor (20) was a cylindrical polyethylene tank of height=1.2 meters and width=0.6 meters holding approximately 200 liters when full. The active volume of the tank was 185 liters and the holdup volume of the circulating loop was 5 liters, adding up to 190 liters of active mixed liquor volume in the system.

The aeration device (10) was made of stainless steel and the balance of the piping (21, 23, 24, 28, 31, 32) was constructed of PVC conduits and valves, and nylon web reinforced clear polyvinyl tubing.

The filtration unit (30) was a tubular module (ZENON Z8) where the tubes are of the ultrafiltration type (ZENON TAM). These were operated at a feed pressure of 412 kPa.

The Z8-TAM unit had a filtration area of 1.1 $m^2$. The membranes are of a thin film composite type, the molecular weight cut-off being 100,000 Daltons. The pure water flux of the membrane was 407 $L/m^3/m^2/hr$ at 275 kPa.

The pump (22) was a single stage centrifugal rated at 75 L/min at 412 kPa. The feed was filtered with a 10 μm bag filter and placed in a 500 liter polyethylene feed tank. A diaphragm metering pump pumped the feed from the feed tank (21) into the bioreactor (20) at the required rates to provide a hydraulic retention time of 7.4, 3.7, 1.7, 0.9 and 0.5 days in the reactor over the period of the experiment.

The ultrafiltration feed loop (24) flow was ≈75 L/min. Inlet pressure to the ultrafiltration unit was controlled at 412 kPa, the back-pressure of 137 kPa resulting in an average pressure of 274 kPa. The concentrate was split into 2 streams, one flowing to the aeration (10), the other directly back to the reactor (20) (conduits not shown). The flow was adjusted such that the stream flowing through the aeration had a velocity flow of at least 1.5 meters/sec. The inlet pressure to the aerator was 101 kPa. In this study oxygen was used and was set to values which maintained a residual dissolved oxygen in the liquid of 1-5 mg/L $O_2$. This was 0.15 to 0.5 L/min of $O_2$ (at STP).

The tests were run over a period of several months during which the reactor biomass concentration ranged from 0.5 to 2 g/L. All tests showed a reduction of BOD of 5000 mg/L in the feed to 45 mg/L and less in the permeate or effluent of the process. The suspended solids were completely (100%) removed by the ultrafiltration unit. The TOC in the feed was reduced from 2500 mg/L to <200 mg/L in the bioreactor, a 90+% removal. The permeate flow of the module was 500-1200 L/min. corresponding to a flux of 1 to 2 $m^3/m^2/day$. This system was also run with a conventional coarse bubble aeration as a comparison. It was found that this device could not maintain the required dissolved oxygen residual when the active biomass concentration was greater than 0.5 g/L even at air flow rates greater than 200 L/min. This corresponded to a BOD loading of up to 0.2 g BOD/g biomass. At the same conditions of BOD loading the coarse bubble aeration was 2% efficient whereas the micronizer was virtually 100% efficient as determined by respiration rate and air/oxygen pumping rates. The inability of the coarse bubble aerator to maintain a dissolved oxygen residual concentration caused the permeate BOD and TOC concentration to rise to 600 mg/L and 500 mg/L respectively, a reduction in removal efficiency of only 90% and 80% respectively as compared to 99% for the micronizer system.

The foregoing results are also obtained in combination with a membrane microfiltration or ultrafiltration device, or combinations thereof. A microfiltration unit may be used in series with an ultrafiltration unit, the former having a pore size in the range from about 0.1 μm to about 1 μm, and the latter having a pore size in the range from about 0.001 μm to about 0.1 μm, each removing suspended, or dissolved and suspended solids respectively in the corresponding size ranges.

Preferred membranes for microfiltration are derived from poly(vinyl alcohol), polysulfone, polypropylene, nylon and the like, for example Zenon SJ. The same materials may be used to provide ultrafiltration membranes, for example a Zenon TAM membrane.

The bacteria found to be effective in the process are commonly found in activated sludge and include the genera Pseudomonas, Zooglea, Achromobacter, Flavobacter, Nocardia, Bdellovibrio, and Mycobacter, normally all considered heterotrophic. These perform the bulk of the bio-stabilization. The autotrophic bacteria which may be present are represented by Nitrosonomas and Nitrobacter, both nitrogen fixing. Also found in activated sludge are a variety of fungus, yeasts and protozoa.

Having thus provided a general discussion, described the overall process in detail and illustrated the invention with specific examples of the best mode of carrying out the process, it will be evident that the invention has provided an effective solution to a difficult problem. It is therefore to be understood that no undue restrictions are to be imposed by reason of the specific embodiments illustrated and discussed, except as provided by the following claims.

I claim:

1. A process for aerating biochemically oxidizable material in the presence of activated sludge particles using a membrane-bioreactor system, comprising, (a) continuously pumping an aqueous suspension of said material and activated sludge particles from a bioreaction zone to a filtration zone from which water which is essentially solids-free is to be recovered;

(b) flowing said suspension through a membranous filtration zone at a velocity and pressure sufficient to maintain a predetermined membrane flux in said filtration zone at which flux essentially no solids are retained on the surface of membrane in said filtration zone;

(c) separating said water which is essentially solids-free from a concentrate containing solids, and removing said water from said system;

(d) directly flowing said concentrate from said membranous filtration zone into a gas micronizing zone comprising a microporous air diffuser element externally disposed relative to said bioreaction zone, without introducing any additional energy into said concentrate until it is introduced into said micronizing zone:

(e) introducing said concentrate into said micronizing zone, while contacting it with a gas containing at least about 20% oxygen under pressure in the range from about 150 kPa to about 1000 kPa so as to incorporate micronized gas bubbles having a diameter in the range from about 1 μm (micron) to about 1000 μm into said concentrate forming a microaerated concentrate having separate gas and liquid phases;

(f) directly flowing a tail-jet of said microaerated concentrate from said micronizing zone into said bioreaction zone without introducing any additional energy into said microaerated concentrate after it leaves said micronizing zone; and, (g) introducing said tail jet of microaerated concentrate into said bioreaction zone below the surface of liquid to terminate a recycle loop in said bioreaction zone, while directing said tail-jet into said bioreaction zone so as to maintain an average liquid velocity of at least 0.3 meter/sec while also maintaining a pattern of circulation therein.

2. The process of claim 1 including continuously introducing a feed of said biochemically oxidizable material into said bioreaction zone.

3. The process of claim 2 including withdrawing a bleed stream of said concentrate from said recycle loop prior to introducing said concentrate into said micronizing zone so as to modulate the concentration of solids in said suspension.

4. The process of claim 3 wherein said concentrate is introduced into said micronizing zone at a velocity of at least about 1.5 meters/sec.

5. The process of claim 4 wherein said microaerated concentrate provides an oxygen transfer into the reaction mass of said bioreaction zone of at least 500 mg/liter/hr.

6. The process of claim 5 wherein said recycle loop provides a power efficiency for said membrane-bioreactor system, of at least 0.9 Kg $O_2$/kWh.

7. The process of claim 4 wherein said micronizing zone is generally cylindrical in shape, said concentrate is introduced longitudinally axially into said micronizing zone and said gas is introduced radially therein, passing through pores from 1–100 μm in diameter in said diffuser element and into said concentrate.

8. The process of claim 4 wherein said micronizing zone is generally cylindrical in shape, said concentrate is introduced radially into said micronizing zone and travels longitudinally axially therein, said gas is introduced longitudinally axially therein, passing radially outwardly through pores from 1–100 μm in diameter in said diffuser element and into said concentrate.

9. In a continuous biodegradation process using live microorganisms in an aqueous environment to oxidize dissolved or suspended organic material in a bioreaction zone wherein biomass is aerated, and a portion of said biomass is withdrawn for circulation through a membranous ultrafiltration zone from which a permeate of high quality water is continuously withdrawn, and the remaining solids-containing concentrate is recycled to said bioreaction zone, the improvement comprising, (a) flowing said solids-containing stream from said membranous zone into a micronizing zone comprising a microporous air diffuser element externally disposed relative to said bioreaction zone;

(b) contacting said solids-containing stream in said micronizing zone, with an oxygen-containing gas at a pressure in the range from about 150–1000 kPa so as to microaerate said stream infusing it with a multiplicity of gas bubbles in the range from 1–1000 μm in diameter, and adding the energy of said gas to the kinetic energy of said solids-containing stream so as to provide a tail-jet leaving said micronizing zone; and, (c) introducing said tail-jet with sufficient motive force to establish a desired recirculation pattern of solids in said biomass, said motive force being provided by the sum of the energies in said solids-containing stream and said gas stream.

10. The process of claim 9 including withdrawing a bleed stream of said concentrate from said recycle loop prior to introducing said concentrate into said micronizing zone so as to modulate the concentration of solids in said suspension.

11. The process of claim 10 wherein said concentrate is introduced into said micronizing zone at a velocity of at least about 1.5 meters/sec.

12. The process of claim 11 wherein said tail-jet provides an oxygen transfer into the reaction mass of said bioreaction zone of at least 500 mg/liter/hr.

13. The process of claim 12 wherein recycling said solids-containing stream through said micronizing zone provides a power efficiency for said membrane-bioreactor system, of at least 0.9 Kg $O_2$/kWh.

14. The process of claim 11 wherein said micronizing zone is generally cylindrical in shape, said concentrate is introduced longitudinally axially into said micronizing zone and said gas is introduced radially therein, passing through pores from 1–100 μm in diameter in said diffuser element and into said concentrate.

15. The process of claim 11 wherein said micronizing zone is generally cylindrical in shape, said concentrate is introduced radially into said micronizing zone and travels longitudinally axially therein, said gas is introduced longitudinally axially therein, passing radially outwardly through pores from 1–100 μm in diameter in said diffuser element and into said concentrate.

16. A wastewater treatment system to be connected between a wastewater inlet and an outlet for treated effluent, comprising, (a) a bioreactor constructed and arranged to operate essentially continuously while maintaining a predetermined liquid level of a biomass within said bioreactor, with means for receiving wastewater containing biodegradable solids, in which bioreactor said wastewater is contacted with waste-degrading microorganisms mixed therein;

(b) pump means for withdrawing a suspension of said solids from said bioreactor, and impelling said suspension at elevated pressure;

(c) membrane filtration means in direct, open flow-receiving communication with said pump means, said membrane filtration means including plural membrane element means for separating said suspended solids in a concentrate stream, from water permeate which is essentially free of solids, and means to duct said permeate away from said system;

(d) a gas micronizing means exteriorly disposed relative to said biomass, and in direct, open flow-receiving communication with said concentrate stream from the filtration means, said gas micronizing means comprising, (i) at least one tubular microporous element having upstream and downstream ends connected by a longitudinal axial bore, said element coaxially housed within a housing means for containing said gas under elevated pressure and contacting said gas with said concentrate stream (ii) inlet means for said gas, and, (iii) inlet and outlet means for said concentrate stream; and, (e) conduit means directly placing said outlet means from the micronizing means in open flow communication with said wastewater in said bioreactor, said conduit means having a tail-jet outlet means for discharging a tail-jet of mixed gas and liquid phases below the surface of said wastewater at a velocity sufficient to generate a preselected pattern of recirculation in said bioreactor while maintaining an average liquid velocity of at least 0.3 meter/sec within said bioreactor.

17. The wastewater treatment system of claim 16 wherein said membrane filtration means is an ultrafiltration membrane having a pore size in the range from 0.05 μm to 0.5 μm.

18. The wastewater treatment system of claim 16 wherein said inlet means for said gas is in said housing, and said inlet and outlet means for said concentrate stream are in open communication with said upstream and downstream ends, respectively, of said microporous element.

19. The wastewater treatment system of claim 16 wherein said inlet means for said gas is in open communication with said upstream end of said element, and said inlet and outlet means for said concentrate stream are in open communication with said housing.

* * * * *